June 30, 1959  E. A. HERIDER ET AL  2,892,487
ADJUSTABLE ACTUATOR

Filed Jan. 24, 1957  3 Sheets-Sheet 1

INVENTORS.
Elmer A. Herider
Herbert A. Friesen
BY
Webb, Mackey & Burden
THEIR ATTORNEYS INVENTORS.
Elmer A. Herider
Herbert A. Friesen
BY
Webb, Mackey & Burden
THEIR ATTORNEYS June 30, 1959   E. A. HERIDER ET AL   2,892,487
ADJUSTABLE ACTUATOR Filed Jan. 24, 1957   3 Sheets-Sheet 3

INVENTORS.
Elmer A. Herider
Herbert A. Friesen
BY
Webb, Mackey & Burden
THEIR ATTORNEYS

# United States Patent Office
2,892,487
Patented June 30, 1959

2,892,487

ADJUSTABLE ACTUATOR

Elmer A. Herider, Dearborn Township, Wayne County, and Herbert A. Friesen, Center Line, Mich., assignors to Rockwell-Standard Corporation, a corporation of Pennsylvania Application January 24, 1957, Serial No. 636,072

13 Claims. (Cl. 155—158)

The present invention relates to a manual actuator for adjusting a load sustaining part. It is particularly adapted for effecting the adjustment, to selective inclinations with respect to a vertical plane, of the pivoted cushion structure on back rest frames of the general type shown in our copending application, Serial No. 636,073, filed January 24, 1957.

The present manual actuator is handle operated and by its general construction it has considerably broad application in addition to the foregoing one specifically mentioned, primarily as a device to operate automobile windows, seat height adjustors, and similar apparatus which requires a quick locking and unlocking motion done from one operating handle. Briefly, the operating elements in this construction include a cushion adjusting linkage which depends for its adjustment on movement of the operating handle, a torque shaft connected to drive the adjusting linkage and having a fixed ratchet and locking pawl means connected at one end for normally holding fast to the torque shaft, and a drive plate connected to the operating handle and carrying a dual functioning crank pin which both pivots the pawl means to unlocked position and becomes effective to constitute the sole driving connection established from that drive plate to rotate the torque shaft while unlocked and adjust the cushion adjusting linkage.

More specifically, the crank pin passes from the drive plate through an elongated opening formed in another plate which is fast to the torque shaft and the resulting pin and slot connection establishes a drive in which the lost motion of the pin in moving to take up the clearance at either end of the elongated opening is the motion required by the pin to pivot the pawl means to unlocked position to render the torque shaft free to turn with the pin and the drive plate. Pressure on the operating handle produces this unlocking and establishes the drive for adjusting the torque shaft and a spring recentering means is provided on the locking pawls so that automatically upon release of that pressure the locking pawls relock the torque shaft in its newly assumed position of adjustment.

A preferred embodiment of the invention is shown in the accompanying drawings in which in general:

Figure 1:
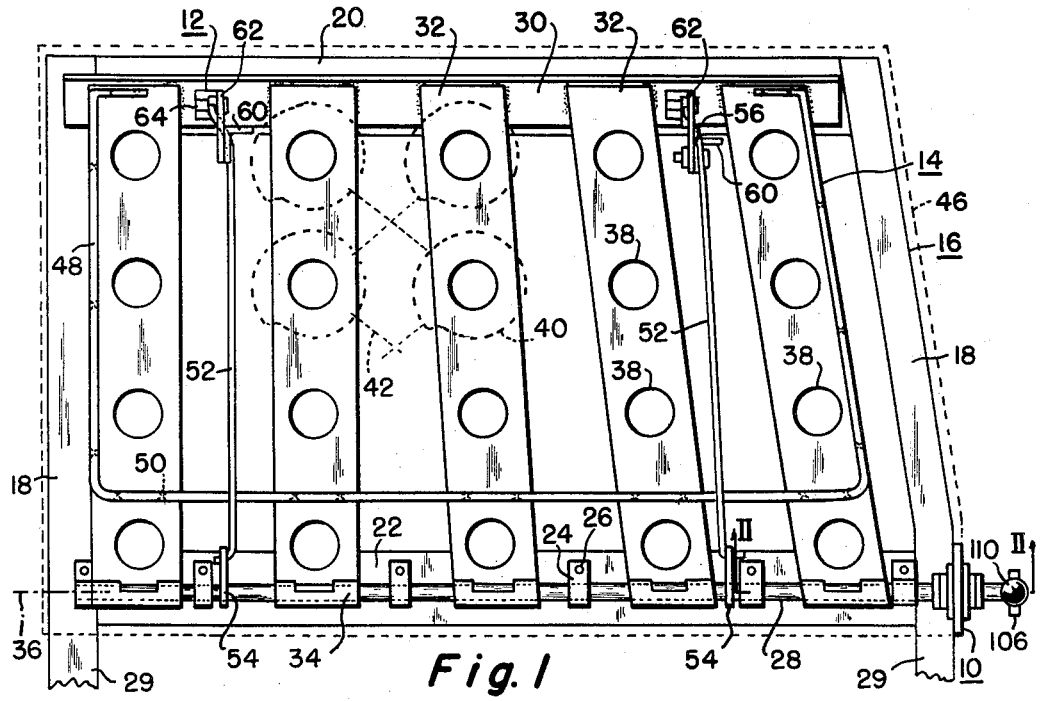
Figure 1 is a front elevation view of back rest structure for use in seating assemblies embodying the present invention.
Figure 2:
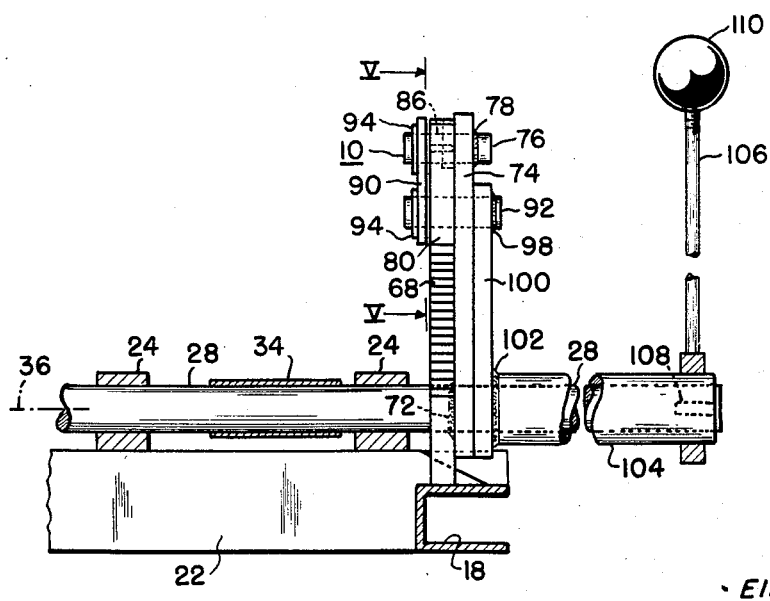
Figure 2 is a sectional view taken along the section lines II—II of Figure 1.
Figure 3:
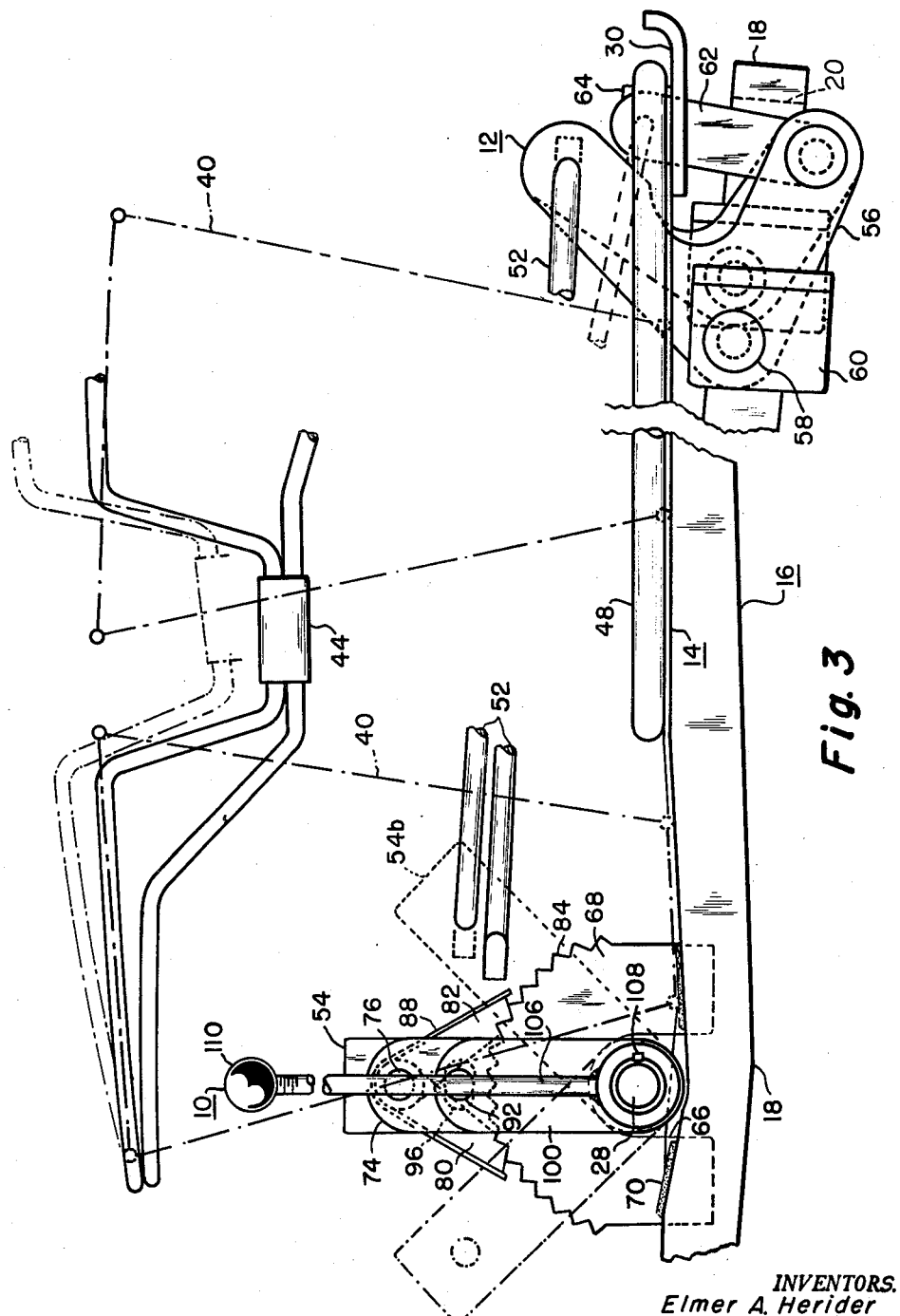
Figure 3 is a side elevational view of the structure of Figure 1.

In more particular reference to Figures 1–3 of the drawings a manual actuator 10 and an adjusting linkage 12 controlled thereby are shown in association with the back rest structure for a seating assembly, not entirely shown, but including supported and supporting frames 14 and 16 which are hinged together along the lower edge and adjustably separated at the upper end by means of the adjusting linkage 12. Ordinarily the frames 14, 16 are slightly inclined in the same direction from a vertical plane, with the supported frame 14 arranged to assume preselected angularity approaching, but never completely vertical.

The supporting frame 16 in the back rest structure includes a pair of spaced vertical side rails 18 joined together by means of upper and lower cross rails 20 and 22. The lower cross rail 22 carries a series of individual loops of steel strip stock which form a row of shaft bearings 24 and which are riveted at 26 to the cross member 22 at longitudinally spaced apart points thereon. The bearings 24 have a torque shaft 28 journaled for rotation therein for operation in conjunction with the actuator 10 at one end of the shaft.

The side rails 18 have extension portions 29 at the lower end of the frame 16 which are rigidly or pivotally secured to the seat frame component of the seat structure, not shown. The supported frame 14 includes a lengthwise extending rim 30 at the top to which the upper ends of a row of spring strip retainers 32 in this frame are welded. At the lower ends the spring strip retainers 32 are turned at 34 to loop about the torque shaft 28 with a hinge action about the longitudinal axes 36 of the latter so as to swing independently of the rotation thereof. Each of the spring strip retainers 32 has a row of four circular flanged seats 38 for supporting a like number of tapered coil springs 40 disposed in vertical rows with their rear ends retained by the flanges of the seats 38. At their larger forward ends the coil springs 40 have an interconnecting series of tie connections 42 to provide a unitary surface and a relatively stiff border wire frame 44, aligned with the large ends of these coil springs, forms therewith a unified spring cushion surface. This surface is covered with the usual foam rubber padding and upholstery cloth to form the hinged padded cushion structure 46 shown in outline in Figure 1.

The spring retainers have a common reinforcing bar 48 of general U-shape which is tack welded at two or more points 50 to each of the retainers 32 so as to rigidify the supported frame 14. The adjusting linkage 12 includes a laterally spaced pair of vertical tension rods 52 each connected at its lower end to an individual crank 54 fast to the torsion shaft 28 and connected at the upper end to the front arm of vertically disposed bell cranks 56 each of which cooperates with the crank 54 vertically aligned therewith to form a parallelogram linkage. Each bell crank 56 has a fixed lower pivot 58 at its apex which carries it for rocking movement forwardly and rearwardly upon a mounting bracket 60 carried by the underside of the upper cross rail 20. The rear arm of each bell crank 56 is pivotally connected to a forwardly extending link 62 which passes through a slot in the rim 30 to a point where it is pivotally connected to a supporting bracket 64 rigid with the rim 30 at the top of the supported frame 14. When the bell cranks 56 rotate counterclockwise together as viewed in Figure 3, the rear legs thereof cause the link 62 to pivot the supported frame 14 forwardly about the axis 36 of the torque shaft 28 as a center. Clockwise movement of the bell cranks 56 about their pivots 58 causes the supported frame 14 to pivot rearwardly into close approach to the supporting frame 16.

The torque shaft 28 passes through an arch 66 formed by an interrupted ratchet wheel 68 having welds 70 at the ends of the arch rigidly affixing the wheel to the lower front surface of the side rail 18. At a point adjacent the plane of the arch 66 the torque shaft 28 has a weld connection 72 to a lock plate 74 which turns with the shaft and carries a transversely extending pawl pin 76 rigidly welded at 78 to the swinging end thereof. The pawl pin 76 carries a pair of depending divergent pawls 80 and 82 each provided with a set of two teeth engageable at balanced locations with a set of ratchet teeth 84 provided on the outside periphery of the ratchet wheel 68. The pawls 80, 82 are scarfed at their upper ends to have only a half thickness apiece, thereby compactly interfitting with one another in well-known manner so as to overlap and swing in a common plane. A set of three transverse pins 86 rigid with the lock plate 74 retains a V-shaped recentering spring 88 formed of flat strip spring stock and continuously biasing the pawls 80 and 82 toward one another into engagement with the ratchet teeth 84. The end of the pawl pin 76 extends past the plane of the ratchet wheel 68 and protrudes loosely through an oversized opening in a retainer plate 90 which is at the opposite side of the ratchet wheel. A similar oversized opening in the opposite end of the retainer plate 90 loosely receives a crank pin 92 and the two pins 76, 92 referred to carry C-shaped spring clips 94 which engage the margins of the oversized openings in the retainer plate so as to overlap and prevent it from sliding off the ends of the pins. Thus the pins 76 and 92 are adapted to have slight relative motion of separation along their line of centers by movement in the plane of the plate 90 about the axis 36 as a center. The pin 92 passes through an elongated slot 96 formed in the lock plate 74 and at the opposite end the pin 92 is welded at 98 to the swinging end of a drive plate 100. The lower edge of the retainer plate 90 radially overlaps with the sides of the teeth 84 on the ratchet wheel 68 to prevent the plates 74, 100 from separating therefrom. The drive plate 100 has the hub welded at 102 to a quill control shaft 104 which is piloted centrally on the torque shaft 28 and which carries an operating handle 106 keyed at 108 thereto. A hand lever knob 110 is threaded to the outer end of the operating handle 106.

The plates 74, 100 swing in arcs on the same side of the ratchet wheel 68, thereby leaving its opposite side fully exposed. That side is therefore free to be anchored at several places to supporting structure without, in any manner, obstructing the path of swing of the plates 74, 100. The crank pin 92 has a neutral or satisfied position in which the pawls 80 and 82 straddle it in a balanced relationship whereby they exactly center it in the slot 96 as shown in solid lines in Figure 5. These pawls 80 and 82 swing in a common parallel plane adjacent the plane of the slot 96 and thus lie squarely in the path of motion of the crank pin 92 at all times so that at least one of these pawls is in continual contact therewith under the bias of the recentering spring 88.

Figure 4:
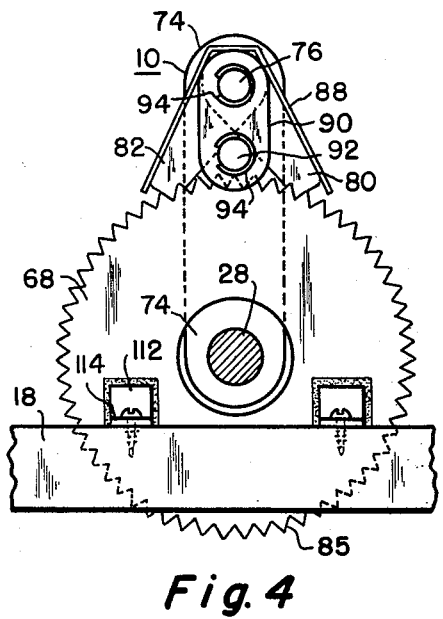
Figure 4 is a view taken in the opposite direction from Figure 3 and showing a slight modification.

Figure 4 is a view taken in a direction opposite from Figure 3 and shows a modification somewhat more general application in which the ratchet wheel 68 provides a full circle of teeth 85 for extended travel greater than one full revolution. A pair of L-shaped cantilever lugs is arranged with their short leg 112 welded to the inside face of the ratchet wheel 68 and the free end of the long leg 114 is screw-connected to the front face of the side rail 18 so that the plane of the ratchet wheel is bodily offset with proper clearance from the side of the rail 18.

Figure 5:
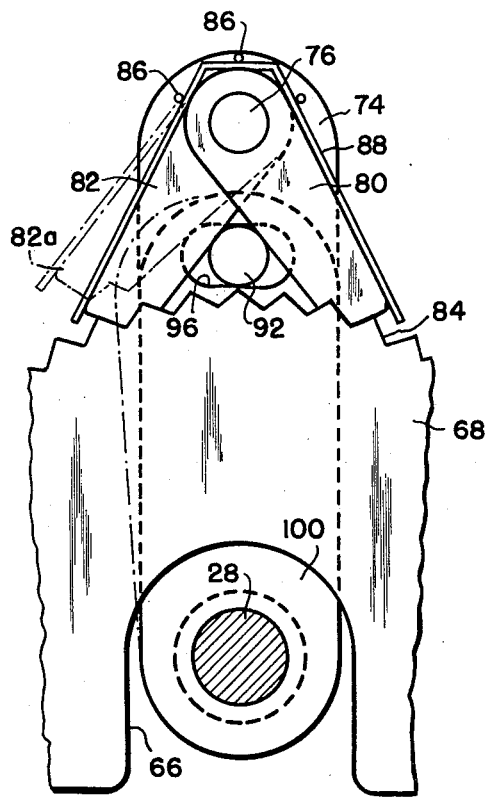
Figure 5 is an enlarged fragmentary section taken along the lines V—V of Figure 2.
Figure 6:
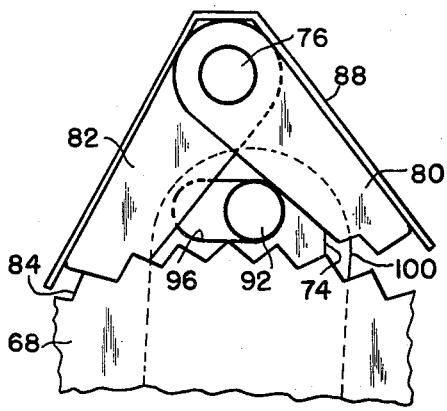
Figure 6 is similar to Figure 5 but shows the parts in an operating position.

In use, pressure on the hand lever knob 110 rocks the operating handle 106 and rotates the crank plate 100 and the crank pin 92 between the positions of Figures 5 and 6. More specifically, the torque shaft 28 turns with the operating handle 106 to cause the crank pin 92 to move from the solid line neutral position shown in Figure 5 into an operating position to the right. As a result of the crank pin 92 thus moving against the right end of the slot 96 as shown in solid lines in Figure 6, the adjacent pawl 80 is deflected upwardly with its teeth unlocked from the ratchet teeth 84 and thereafter the two plates 74 and 100 turn simultaneously in the same direction as the torque shaft 28. Release of pressure on the operating handle 106 enables the recentering spring 88 to reengage the pawl 80 with the ratchet wheel and recenter the crank pin 92 between the ends of the slot 96, the pawls providing a two-way lock against further movement of the lock plate 74 so long as the crank pin stays centered. Reverse movement of the crank pin 92 causes the pawl 82 to lift upwardly on its pivot into the dotted line position 82a of Figure 5 whereupon the plates 74 and 100 move counterclockwise as viewed in Figure 5 with the opposite pawl 80 continually effective to prevent retrograde turning of the shaft 28.

In overall operation of the actuator 10 of the preceding figures, the operating handle 106 is manually rocked clockwise or counterclockwise as viewed in Figure 3 to move the drive plate 100 with similar motion. After predetermined initial movement, the crank pin 92 takes up the entire clearance at the end of the slot 96 to solidly engage it and simultaneously it disengages one of the pawls 80, 82 from the ratchet wheel so as to cause the lock plate 74 to move and drive the torque shaft 28 and the spaced cranks 54 conjointly therewith. The tension rods 52 in the parallelogram linkage 12 cause the bell cranks 56 to rotate counterclockwise or clockwise on their pivots 58 according to Figure 3 and correspondingly pivot the cushion-carrying, supported frame 14. Motion of the crank pin 92 either way from the center of the elongated slot 96 is the motion required for unlocking the pawls and simultaneously completing a lost motion positive drive connection with the lock plate 74. This motion can be varied by varying the size of the teeth 84 on the ratchet wheel and by varying the location of the crank pin 92 with respect to the pawl carrying pin 76. The fact that the crank pin 92 is a single element which both releases one pawl and establishes the drive accounts for a highly satisfactory consolidated operation in which there are no pairs of elements or companion parts subject to bending which must be exactly coordinated in driving the present mechanism.

It is evident that the positive lock herein provided can also be accomplished to equal advantage by using a corrugated ratchet in place of the wheel 68 and a fiber or a rubber contact at the ends of the pawls 80 and 82. In any case, it is appreciated that the lock and drive plates 74, 100 operate with a maximum leverage ratio to one another for a given outside diameter of the actuator 10 and the transfer or torque therebetween occurs always along a path outwardly of the circumference of the ratchet wheel 68. Therefore the ratchet wheel is made just sufficiently large in diameter for proper operation but no larger, whereas in comparative structures employing internally toothed ratchet wheels, the wheel diameter must of necessity exceed the lever diameter and therefore in terms of space requirements, the limiting diameter is the outside diameter of the ratchet wheel which is undesirable. In the present invention, the dimensions of the actual work-performing elements are the sole controlling factor on the overall size of the manual actuator.

Variations within the spirit and scope of the invention described are easily comprehended from the foregoing description.

We claim:

1. For use with a hinged adjustable cushion on a seat structure, a manual actuator comprising a pair of relatively rotatable shafts adapted for mounting on said seat structure with one normally locked, but when unlocked arranged to transmit torque for cushion adjustment purposes, plates rigidly mounted to the different shafts at adjacent points thereon for cooperation with one another, a pin affixed to one of said plates to establish engagement with the other after initial motion of relative rotation aforesaid to turn the plates and shafts in synchronism, a ratchet wheel adapted for stationary mounting on said seat structure adjacent the plane of motion of said plates, and latched pawl means operatively connecting said stationary ratchet wheel and the plate mounted to said one shaft and disposed in the immediate path of said pin at a point such that initial motion in the above described manner is the motion sufficient to unlatch the pawl means enabling the locked position of said one shaft to be changed with the other shaft.

2. For use with structure formed of frames which are hinged together at one edge and which have means to adjust the relative separation of the same comprising a shaft assembly including a torque shaft and adapted for mounting on said structure, the combination with said shaft assembly of an actuating mechanism comprising a relatively rotatable second shaft included in said shaft assembly and likewise adapted for mounting on said structure for rotating and locking the torque shaft for frame adjustment purposes, said mechanism providing a lost motion drive between the shafts including a pin and slot connection therebetween to form said drive and having a satisfied position in which the pin is centered in the slot, a fixed ratchet wheel adapted for mounting on said structure, and pawl means in engagement with the wheel to form an operative connection for locking the torque shaft, said pawl means having a disposition closely spaced to the plane of the slot and astraddle of the path of movement of the pin in a manner that said pin simultaneously deflects one pawl as it shifts into driving engagement with either end of the slot.

3. The combination with a pair of frames hinged together at one end, of means to adjust the same including a torque shaft connected to relatively move and hold the frames adjustably separated at the other end, actuating mechanism including a relatively rotatable second shaft for rotating and locking the torque shaft to adjust the frames, said mechanism providing a lost motion drive between the shafts including a single pin and slot connection having a satisfied position in which the pin is centered in the slot, and pawls operatively connected to the torque shaft in a disposition closely spaced to the plane of the slot and astraddle of the path of motion of the pin in a manner that said pin simultaneously deflects one pawl as it shifts into driving engagement with either end of the slot, said pawls otherwise having an undeflected position of engagement both with the pin and with a fixed ratchet wheel to provide a two-way lock on the torque shaft.

4. In an actuator for the adjustable parts in hinge-jointed seat structure, the combination of a linkage-connected shaft adapted for mounting on said structure, a control shaft arranged coaxially therewith and rotatable relative thereto to transmit torque to the linkage connected shaft, a fixed ratchet wheel adapted for mounting on said structure adjacent said shafts and provided with an externally arranged set of teeth concentric to the shafts, a pair of plates affixed at adjacent points to the different shafts to swing in arcs alongside one face of the ratchet wheel, opposed pawls having biasing means pressing them inwardly on the ratchet teeth and pivotally carried by the nearer plate, and a pawl releasing crank pin extending into and between the ends of a slot in said nearer plate and passing through a point straddled by said pawls in the plane of said ratchet wheel, said crank pin being rigidly affixed to the other plate to establish a lost motion drive between the shafts by solid engagement with either opposite end of said slot as it moves sufficiently in that slot to take up the clearance.

5. In a locking means for the adjustable parts in a hinge-jointed seat structure, the combination of a linkage-connected shaft adapted for mounting on said structure, a control shaft arranged coaxially therewith and rotatable relative thereto to transmit torque to the linkage-connected shaft, a fixed ratchet wheel adapted for mounting on said structure adjacent said shafts and provided with an externally aranged set of teeth concentric to the shafts, a pair of plates affixed at adjacent points to the different shafts to swing in arcs alongside only one face of the ratchet wheel, a cooperating pair of relatively shiftable pawl carrying and pawl-releasing pins, opposed pawls pivoted to the pawl carrying pin and having biasing means pressing them inwardly on the ratchet teeth, said pawl releasing pin extending into and between the ends of a slot in one of said plates and passing through a point straddled by said pawls in the plane of said ratchet wheel, said pawl-carrying pin being rigidly affixed to said one plate, said pawl-releasing pin being rigidly affixed to the other plate to establish a lost motion drive between the shafts by solid engagement with either of the opposite ends of said slot as it moves sufficiently in the slot to take up the clearance to that end.

6. In a locking means for the adjustable parts of a hinge-jointed seat structure, the combination of a linkage-connected shaft adapted for mounting on said structure, a control shaft arranged coaxially therewith and rotatable relative thereto to transmit torque to the linkage-connected shaft, a fixed ratchet wheel adapted for mounting on said structure adjacent said shafts and provided with an externally arranged set of teeth concentric to the shafts, a pair of plates affixed at adjacent points to the different shafts to swing in arcs alongside only one face of the ratchet wheel, a cooperating pair of relatively shiftable pawl carrying and pawl releasing pins, opposed pawls pivoted to the pawl carrying pin and having biasing means pressing then inwardly on the ratchet teeth, said pawl releasing pin extending into and between the ends of a slot in one of said plates and passing through a point straddled by said pawls in the plane of said ratchet wheel, said pawl-carrying pin being rigidly affixed to said one plate, said pawl releasing pin being rigidly affixed to the other plate to establish a lost motion drive between the shafts by solid engagement with either of the opposite ends of said slot as it moves sufficiently relative to the slot to take up the clearance to that end, and a retaining plate having an oversized hole loosely receiving the free end of each of said pins and secured thereupon in a manner to clamp and retain the pawls in place while accommodating the relative shift aforesaid of the pins in a direction effective to make a limited change in their relative center distance.

7. In a locking means for the adjustable parts in a hinge-jointed seat structure, the combination of a linkage-connected shaft adapted for mounting on said structure, a relatively rotatable coaxial control shaft arranged to transmit torque thereto, a fixed ratchet wheel adapted for mounting on said structure adjacent said shafts and provided with an externally arranged set of teeth concentric to the shafts, a pair of plates affixed at adjacent points to the different shafts to swing in arcs alongside only one face of the ratchet wheel, a cooperating pair of relatively shiftable pawl carrying and pawl releasing pins, opposed pawls pivoted to the pawl carrying pin and pressing inwardly on the ratchet teeth, said pawl releasing pin extending into and between the ends of a slot in one of said plates and passing through a point straddled by said pawls in the plane of said ratchet wheel, said pawl-carrying pin being rigidly affixed to said one plate, said pawl releasing pin being rigidly affixed to the other plate to establish a lost motion drive between the shafts by solid engagement with either of the opposite ends of said slot as it moves sufficiently relative to the slot to take up the clearance to that end, and biasing means biasing the pawls into engagement with the ratchet teeth and simultaneously biasing them from opposite sides against the pawl releasing pin to force it to seek a balanced center position between the ends of the slot.

8. Releasable locking structure for use in conjunction with an adjusting linkage and with a fixed ratchet wheel therefor in a seat assembly, said locking structure comprising a lock plate and a drive plate which together confront the same face of the ratchet wheel so as to leave the opposite face open and which together are adapted to be pivoted to said assembly to swing on a common axis fixed therein and arranged to pass through the plane of and concentrically with respect to the ratchet wheel, a pair of spaced, opposed pawls for establishing a two-way locked connection with the ratchet wheel pivotally mounted to the lock plate, and a pawl releasing crank pin rigid with the drive plate and passing in the space between the pawls so as to selectively pivot them on their mounting upon relative motion between the plates.

9. An actuator for adjusting mechanism in a seat assembly, said actuator comprising an externally toothed ratchet wheel adapted for mounting to said assembly, a torque shaft adapted to be rotatably mounted to said assembly to operate the adjusting mechanism and defining a fixed axis passing concentrically through the plane of the ratchet wheel, a lock plate fast to the torque shaft at a point on one side of said plane, a drive plate for driving the lock plate and disposed on the same side of said ratchet wheel plane therewith, and divergent pawl elements provided with biasing means and independently carried by the lock plate and individually pressing inwardly on the ratchet wheel against the teeth thereof, said drive plate being provided with mounting means which includes the torque shaft and by which the drive plate is adapted to be rotatably mounted to said assembly, said drive plate carrying a crank pin consituting the sole means of releasing the pawls and operatively connected to drive the lock plate, said crank pin extending loosely through an opening in the lock plate and having a position intervening between said pawl elements, said crank pin being capable of limited shifted movement in said opening sufficient to pivot either pawl element out of locked engagement with the ratchet teeth.

10. Releasable locking structure for the adjusting mechanism in a seating assembly, said structure comprising a ratchet wheel adapted for mounting to said assembly, a torque shaft adapted to be rotatably mounted to said assembly, to operate the adjusting mechanism and defining a fixed axis passing concentrically through the plane of the ratchet wheel, a lock plate fast to the torque shaft, an adjacent drive plate to move the lock plate for driving the shaft, and divergent pawl elements provided with biasing means and independently carried by the lock plate and individually pressing inwardly on the ratchet wheel against the teeth thereof, said drive plate being provided with mounting means which includes the torque shaft and by which the drive plate is adapted to be rotatably mounted to said assembly, said drive plate carrying a crank pin constituting the sole means of releasing the pawls and operatively connected to drive the lock plate, said crank pin extending loosely through an opening in the lock plate and having a position intervening between said pawl elements, said crank pin being capable of limited shifted movement in said opening sufficient to pivot either pawl element out of locked engagement with the ratchet teeth.

11. The combination with supported and supporting frames, of a torque shaft common thereto and hinging the frames together adjacent one end, means including a linkage operatively connected to the torque shaft to relatively move and hold the frames with their other ends separated in adjusted positions, and mechanism for rotating and locking the torque shaft to adjust the frames including a relatively rotatable second shaft, means forming a lost motion drive between the shafts comprising a pin and slot connection having a satisfied position in which the pin is centered in the slot, pawls which straddle the path of movement of the pin in a manner that it simultaneously pivots one pawl as the pin shifts into driving engagement with either end of the slot, and means effective to recenter the pin in the slot comprising biasing means biasing the pawls into engagement with the pin and with a ratchet wheel fixed with respect to one of the frames.

12. Releasable locking mechanism of the locking pawl and pawl wheel type for use with an adjusting linkage in vehicle structure, wherein the pawl wheel element is fixed with respect to the latter and presents at least a partially circumferentially extending periphery, said locking mechanism comprising the combination of first and second shafts telescoped in an assembly one within another with an extension portion at one end of one shaft extending beyond the corresponding end of the other shaft, a lever mounted to the opposite end of said other shaft, a lever mounted to said extension portion, said shaft assembly being adapted for mounting to said structure with a plate carried by each shaft at a common location between said levers and together confronting said pawl wheel element so as to swing on a common axis concentric to the latter, a pair of spaced, oppositely directed locking pawls pivotally carried by one of said plates for establishing a two-way locked connection with the circumferential periphery of the pawl wheel element, one of said levers constituting an adjusting linkage lever and the other an operator-operated lever to move the plates and reset the adjusted position of said linkage lever by rotating same in one or the other of two opposite directions, and a pawl releasing crank pin carried by the other plate for striking said one plate to move the plates together in one or the other of the two opposite directions aforesaid, said crank pin passing in the space between the oppositely directed pawls so that, when it moves in either of the two directions it selectively pivots one pawl only, depending upon the particular direction of progress selected, thereby introducing a one-way unlocked connection with the pawl wheel periphery.

13. Releasable locking mechanism comprising the combination according to claim 12, wherein the first of said shafts is adapted to be journalled to said structure and the other shaft is journalled to and supported by the first shaft, and wherein said plates are mounted thereto at points confronting the same face of the pawl wheel element so as to leave the opposite face open, said crankpin carrying other plate and said operator-operated lever being fast to the same shaft and said one pawl-carrying plate and said adjusting linkage lever each being fast to the other shaft.

References Cited in the file of this patent

UNITED STATES PATENTS

| 692,869 | Lemp | Feb. 11, 1902 |
| 976,199 | Saulnier | Oct. 25, 1905 |
| 980,008 | Romines | Dec. 27, 1910 |

FOREIGN PATENTS

| 524 | Great Britain | Dec. 18, 1902 |
| 406,281 | Germany | Nov. 21, 1924 |
| 625,155 | Germany | Feb. 5, 1936 |
| 738,123 | France | Oct. 11, 1932 |
| 2,355,762 | France | Aug. 15, 1944 |